(12) United States Patent
Tredoux et al.

(10) Patent No.: US 9,274,777 B2
(45) Date of Patent: Mar. 1, 2016

(54) METHOD AND APPARATUS FOR UNIVERSAL CONTROL OF NETWORKED DEVICES

(71) Applicant: Xerox Corporation, Norwalk, CT (US)

(72) Inventors: Gavan Leonard Tredoux, Penfield, NY (US); Peter J. Zehler, Penfield, NY (US); Premkumar Rajendran, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/272,138

(22) Filed: May 7, 2014

(65) Prior Publication Data

US 2015/0324180 A1    Nov. 12, 2015

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/445 | (2006.01) |
| G06F 13/10 | (2006.01) |

(52) U.S. Cl.
CPC ............... *G06F 8/61* (2013.01); *G06F 13/102* (2013.01)

(58) Field of Classification Search
None
See application file for complete search history.

(56) References Cited

U.S. PATENT DOCUMENTS

| | | | | |
|---|---|---|---|---|
| 7,543,298 | B1* | 6/2009 | Tang et al. | 719/310 |
| 2004/0167974 | A1* | 8/2004 | Bunn et al. | 709/223 |
| 2007/0239903 | A1* | 10/2007 | Bhardwaj et al. | 710/8 |
| 2009/0150909 | A1* | 6/2009 | Barreto et al. | 719/324 |
| 2012/0303801 | A1* | 11/2012 | Raschke et al. | 709/224 |

* cited by examiner

*Primary Examiner* — H S Sough
*Assistant Examiner* — William C Wood

(57) ABSTRACT

A method, non-transitory computer readable medium, and apparatus for communicating a command to a networked device that requires a driver via an endpoint device that does not have the driver installed are disclosed. For example, the method establishes a first connection with virtual device server, establishes a second connection with a universal device driver API server, transmits a command to the universal device driver API server, receives a translated command compatible with the driver of the networked device from the virtual device server, wherein the translated command is received by the virtual device server from the driver that is called by the universal device driver API server, establishes a third connection with the networked device using identical connection information associated with the second connection with the virtual device server and transmits the translated command to the networked device over the third connection.

20 Claims, 3 Drawing Sheets

METHOD AND APPARATUS FOR UNIVERSAL CONTROL OF NETWORKED DEVICES

The present disclosure relates generally to control of networked devices and, more particularly, to a method and apparatus for universal control of networked devices without requiring an on-premise server.

BACKGROUND

There is no widely standardized method for communicating with networked devices. Different manufacturers support different standards, often specific to only the devices of the manufacturer. Operating systems, such as Windows® for example, allow the installation of vendor-supplied drivers, which translate commands executed against the Windows® application programming interface (API) into vendor-specific commands. The commands are sent "over the wire" to the networked device in vendor-specific ways.

However, other operating systems may not have such drivers. For example, operating systems of mobile devices cannot typically use such drivers natively. While some vendors may offer drivers for these platforms, there is a need for programs running on operating systems of mobile devices to be able to connect to and control these networked devices, which is difficult with the current state of technology.

One could create a separate driver for every possible operating system, whether desktop or mobile. However, creating drivers is a labor intensive and error prone process.

SUMMARY

According to aspects illustrated herein, there are provided a method, a non-transitory computer readable medium, and an apparatus for communicating a command to a networked device that requires a driver via an endpoint device that does not have the driver installed. One disclosed feature of the embodiments is a method that establishes a first connection with a virtual device server, establishes a second connection with a universal device driver application programming interface (API) server, transmits a command to the universal device driver API server, receives a translated command compatible with the driver of the networked device from the virtual device server, wherein the translated command is received by the virtual device server from the driver that is called by the universal device driver API server, establishes a third connection with the networked device using identical connection information associated with the first connection with the virtual device server and transmits the translated command to the networked device over the third connection.

Another disclosed feature of the embodiments is a non-transitory computer-readable medium having stored thereon a plurality of instructions, the plurality of instructions including instructions which, when executed by a processor, cause the processor to perform an operation that establishes a first connection with a virtual device server, establishes a second connection with a universal device driver application programming interface (API) server, transmits a command to the universal device driver API server, receives a translated command compatible with the driver of the networked device from the virtual device server, wherein the translated command is received by the virtual device server from the driver that is called by the universal device driver API server, establishes a third connection with the networked device using identical connection information associated with the first connection with the virtual device server and transmits the translated command to the networked device over the third connection.

Another disclosed feature of the embodiments is an apparatus comprising a processor and a computer readable medium storing a plurality of instructions which, when executed by the processor, cause the processor to perform an operation that establishes a first connection with a virtual device server, establishes a second connection with a universal device driver application programming interface (API) server, transmits a command to the universal device driver API server, receives a translated command compatible with the driver of the networked device from the virtual device server, wherein the translated command is received by the virtual device server from the driver that is called by the universal device driver API server, establishes a third connection with the networked device using identical connection information associated with the first connection with the virtual device server and transmits the translated command to the networked device over the third connection.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for communicating a command to a networked device that requires a driver via an endpoint device that does not have the driver installed. As discussed above, there is no widely standardized method for communicating with networked devices. Different manufacturers support different standards, often specific to only the devices of the manufacturer.

However, some endpoint devices use operating systems that may not have the drivers that are required, or needed, to communicate commands to the networked devices that require vendor specific drivers. For example, operating systems of mobile devices cannot typically use such drivers natively. While some vendors may offer drivers for these platforms, there is a need for programs running on operating systems of endpoint devices (e.g., mobile endpoint devices) to be able to connect to and control these networked devices, which is difficult with the current state of technology.

One could create a separate driver for every possible operating system, whether desktop or mobile. However, creating drivers is a labor intensive and error prone process.

One embodiment of the present disclosure addresses this problem by providing a system and architecture that provides universal control of networked devices that require vendor specific drivers without requiring an on-premise server. For example, mobile endpoint devices that use mobile operating systems may communicate and send commands to networked devices that require vendor specific drivers (e.g., scanners, printers, multi-function devices (MFDs), and the like). In one embodiment, the mobile endpoint devices may issue commands without any modification or alteration of the networked device's hardware or software, even though the mobile endpoint device does not have the vendor specific driver installed.

Figure 1:
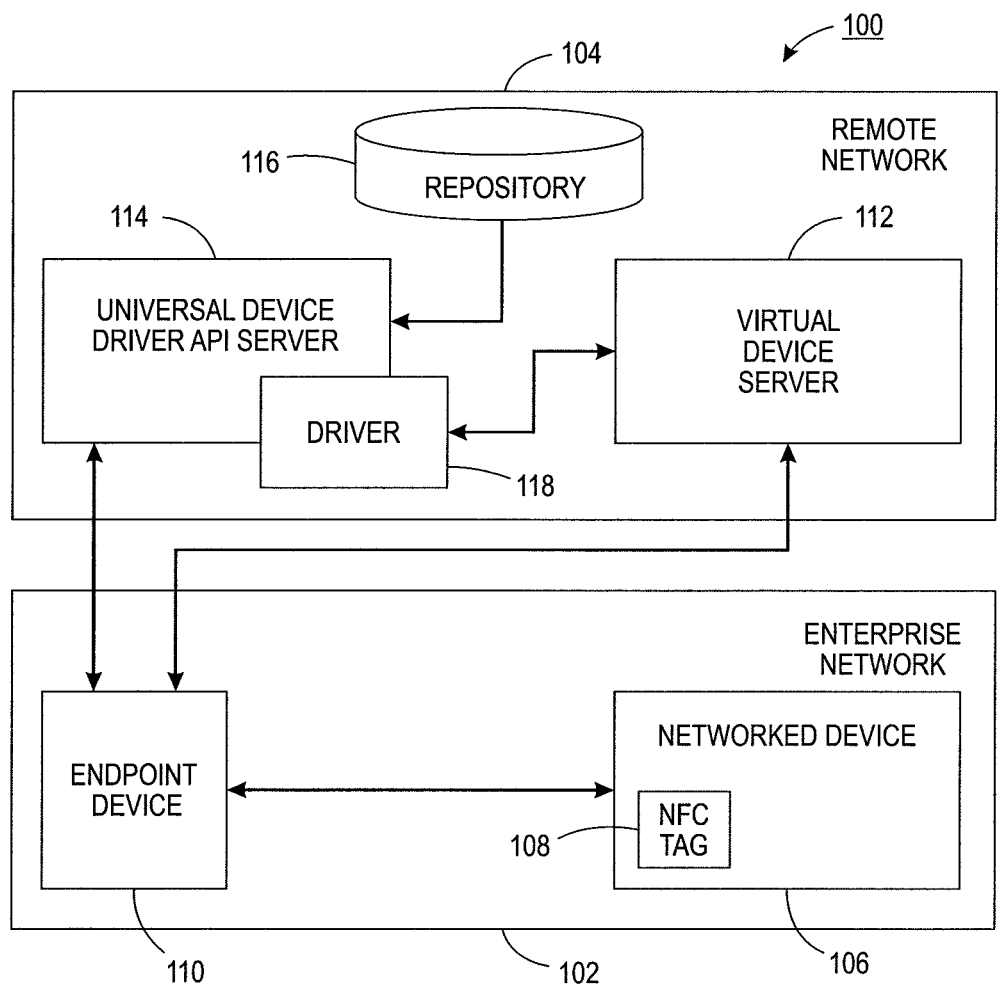
FIG. 1 illustrates an example block diagram of a system of the present disclosure.

FIG. 1 illustrates an example system 100 of the present disclosure. The system 100 may include an enterprise network 102 and a remote network 104. In one embodiment, the enterprise network 102 may be a local network of a company or enterprise. In one embodiment, the remote network 104 may be a network in the "cloud" or accessible over the Internet.

It should be noted that the enterprise network 102 and the remote network 104 are simplified for ease of explanation. The enterprise network 102 and the remote network 104 may include additional access networks or network elements (e.g., firewalls, border elements, gateways, application servers, and the like) that are not shown.

In one embodiment, the enterprise network 102 includes a networked device 106 and an endpoint device 110. In one embodiment, the networked device 106 may be any type of device that is connected to the enterprise network 102 over a wireless or wired connection. In one embodiment, the networked device 106 may be a scanner, a printer, a multi-function device (MFD), a copy machine, and the like.

In one embodiment, the endpoint device 110 may be any type of endpoint device that is attempting to issue a command to the networked device 106 to perform an action (e.g., scan, copy, print, and the like). The endpoint device 110 may include, for example, a mobile endpoint device (e.g., a smartphone, a cellular telephone, a laptop computer, tablet computer, and the like), a desktop computer, and the like.

In one embodiment, the networked device 106 may require a vendor specific driver for a particular operating system (e.g., Windows®). However, the endpoint device 110 may be operating on a different operating system that cannot natively use vendor specific drivers required by the networked device 106. In other words, a driver required for the networked device 106 may not be available for the operating system of the endpoint device 110. As a result, the endpoint device 110 would be incapable of communicating with or sending commands to the networked device 106 with currently available technologies.

However, one embodiment of the present disclosure provides a system 100 that includes servers in the remote network 104 that translate the desired command into a translated command that is compatible with the vendor specific driver of the networked device 106. In one embodiment, the remote network 104 may include a universal device driver application programming interface (API) server and a virtual device server 112.

In one embodiment, the universal device driver API server 114 may store a plurality of different drivers for different devices. The different drivers may also include different versions of the drivers depending on the operating system for the devices. The universal device driver API server 114 may communicate with the endpoint device 110 using a universal command language (e.g., Xerox's® extensible interface platform (EIP)). The universal device driver API server 114 may communicate with the endpoint device 110 via a universal API installed and operating on the endpoint device 110.

In one embodiment, the universal device driver API server 114 may also be in communication with a repository 116. The repository 116 may store responses or data received from the networked device 106. The endpoint device 110 may then pull the data from the repository 116 via the universal device driver API server 114, as discussed below.

In one embodiment, the virtual device server 112 may act as a virtual device representing the networked device 106. As a result, when a driver 118 on the universal device driver API server 114 issues a command, the virtual device server 112 appears to the driver 118 as the networked device 106. For example, if the networked device 106 is a networked scanner, the virtual device server 112 may be a virtual scanner server that appears to the driver 118 as the networked scanner. In addition, the driver 118 does not know or is not aware that it is not actually communicating with the networked device 106.

Although, the universal device driver API server 114, the repository 116 and the virtual device server 112 are illustrated in FIG. 1 as being separate devices, it should be noted that the universal device driver API server 114, the repository 116 and the virtual device server 112 may be deployed as a single server in the remote network 104. It should be also noted that any number of universal device driver API servers 114, repositories 116 and virtual device servers 112 may be deployed in one or more different remote networks 104.

In one embodiment, the endpoint device 110 may initiate a connection with the networked device 106. For example, the endpoint device 110 may scan a near field communication (NFC) tag 108 using a "tap to print" or a "tap to scan" feature of the networked device 106. In another embodiment, the endpoint device 110 may simply attempt to connect to the networked device 106 over the enterprise network 102 using a wired or a wireless connection.

When the endpoint device 110 connects to the networked device 106, the endpoint device 110 may display a universal API to the user. The universal API may be a graphical user interface that includes commands that are associated with the networked device 106. For example, if the networked device 106 is a MFD, the universal API may include commands such as scan, copy, print, save, and the like.

As noted above, the vendor specific drivers required by the networked device 106 may not be installed on the endpoint device 110. As a result, the endpoint device 110 may not send or transmit the desired commands directly to the networked device 106. However, the system 100 allows the endpoint device 110 to send the desired command to the universal device driver API server 114 over a virtual IP address and receive a translated command that is compatible with the driver of the networked device 106 from the virtual device server 112.

For example, after the endpoint device 110 connects with networked device 106, the endpoint device 110 may initiate a connection to the virtual device server 112. In one embodiment, the endpoint device 110 may communicate with the virtual device server 112 in any communication protocol that does not alter or change the translated command that is eventually received from the virtual device server 112, as discussed below. Examples of communication protocols that may be used include an extensible messaging and presence protocol (XMPP), transported using secure hypertext transfer protocol (HTTPS), and the like.

In one embodiment, the virtual device server 112 may be capable of binding to a plurality of different virtual IP addresses reserved for the virtual device server 112. The endpoint device 110 may instruct the virtual device server 112 to bind to an available virtual IP address. The endpoint device 110 may receive the virtual IP address and map the virtual IP address to the actual IP address of the networked device 106.

Concurrently, the endpoint device 110 may initiate a connection with the universal device driver API server 114. In one embodiment, the universal device driver API server 114 and the endpoint device 110 may communicate via the universal API operating on the endpoint device 110 using a universal command language. One example of the universal command language includes the EIP protocol of Xerox® Corporation.

In one embodiment, the endpoint device 110 may send the desired command and the virtual IP address bound to the virtual device server 112 to the universal device driver API server 114. Based on the command and the operating system associated with the command, the universal device API server 114 may call the corresponding driver 118. The universal device driver API server 114 may then translate the command received from the endpoint device 110 in the universal command language into a translated command compatible with the driver 118.

In one embodiment, the driver 118 may then issue the translated command to the virtual device server 112 over the virtual IP address. The virtual device server 112 may then forward the translated command to the endpoint device 110. After the endpoint device 110 receives the translated command from the virtual device server 112, the endpoint device may transmit the translated command to the networked device 106 such that the networked device 106 can execute the desired command.

In one embodiment, the networked device 106 may operate using a dynamic port assignment for a second return connection to the networked device 106. In one embodiment, the endpoint device 110 may be programmed to review the translated command from the virtual device server 112 to obtain the dynamic port assignment. The endpoint device 110 may then connect to the appropriate port to establish a return connection and transmit the translated command to the networked device 106.

In one embodiment, the endpoint device 110 may receive a response from the networked device 106. For example, the response may be scan data if the networked device 106 is a scanner. However, since the endpoint device 110 does not have the vendor specific drivers, the endpoint device 110 may not be able to understand the response.

The endpoint device 110 may send the response to the virtual device server 112. The virtual device server 112 may then send the response to driver 118 called by the universal device driver API server 114. The universal device driver API server 114 may then translate the response into the universal command language such that the endpoint device 110 may be able to understand, read or display the response.

In one embodiment, the response (e.g., scan data) may be stored in the repository 116. The endpoint device 110 may then pull the translated response from the repository 116 via the universal device driver API server 114. In another embodiment, the translated response may simply be passed through directly to the endpoint device 110 via the universal device driver API server 114 without storing the response in the repository 116.

Thus, the system 100 provides universal control of networked devices with any endpoint device. Notably, the endpoint device 110 does not need to install any vendor specific drivers for any specific operating system. In addition, the networked device 106 is not modified or altered in any way. In other words, the software or the hardware of the networked device 106 does not need to be reconfigured to be compatible with the endpoint device 110 that does not have the vendor specific drivers installed.

Rather, the system 100 allows the endpoint device 110 to send commands to the universal device driver API server 114 to have the commands translated and passed back to the endpoint device 110 from the virtual device server 112 so that the translated commands can be transmitted to the networked device 106. As a result, the networked device 106 behaves as if the networked device 106 were communicating with an endpoint device 110 that has installed the proper driver or drivers.

In addition, the universal device driver API server 114 and the virtual device server 112 are located in the "cloud" or a remote network 104 that can be accessed via the Internet. As a result, the enterprise does not need to expend capital or resources to deploy or maintain an on-premise server.

Figure 2:
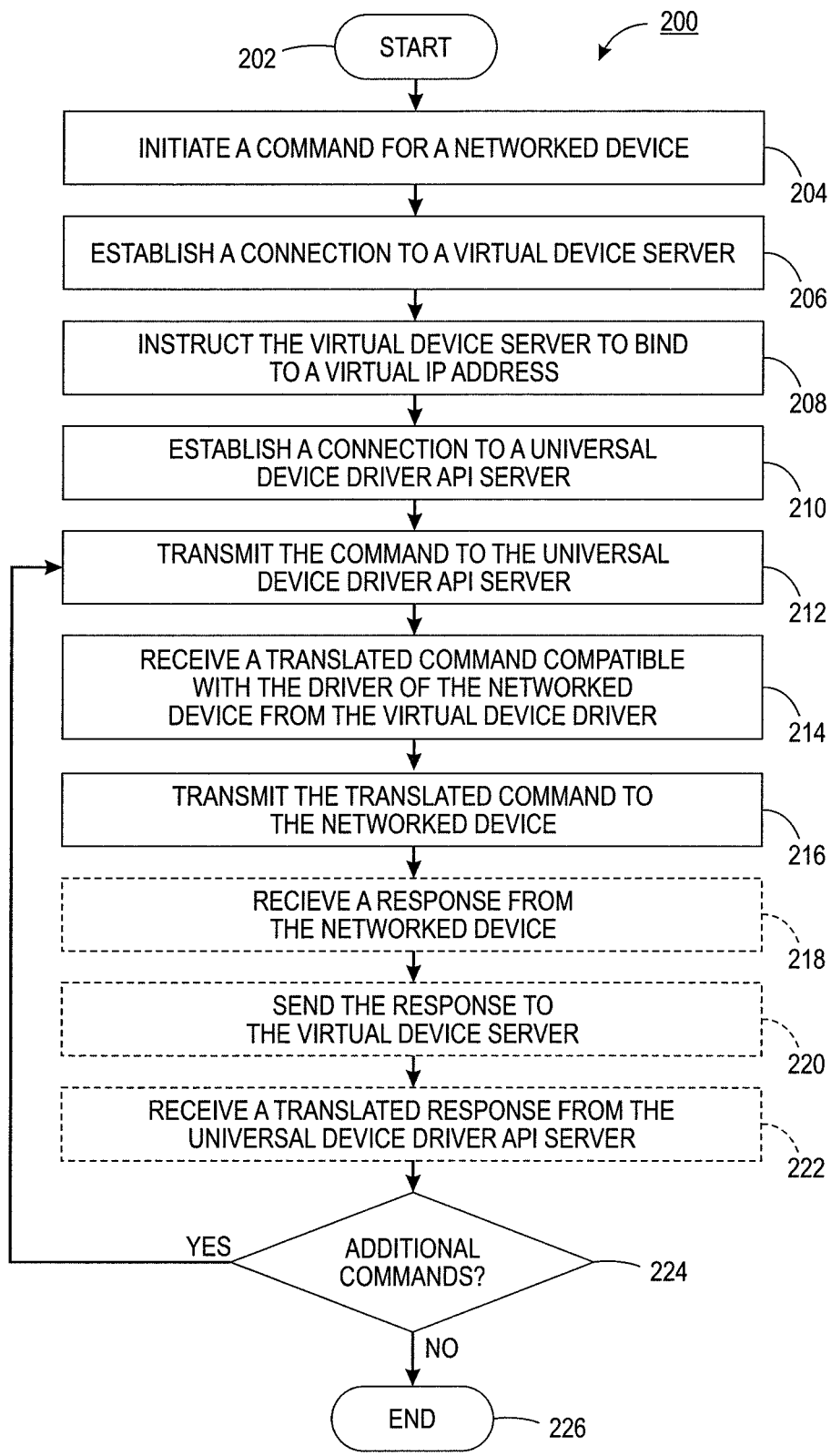
FIG. 2 illustrates an example flowchart of one embodiment of a method for communicating a command to a networked device that requires a driver via an endpoint device that does not have the driver installed.
Figure 3:
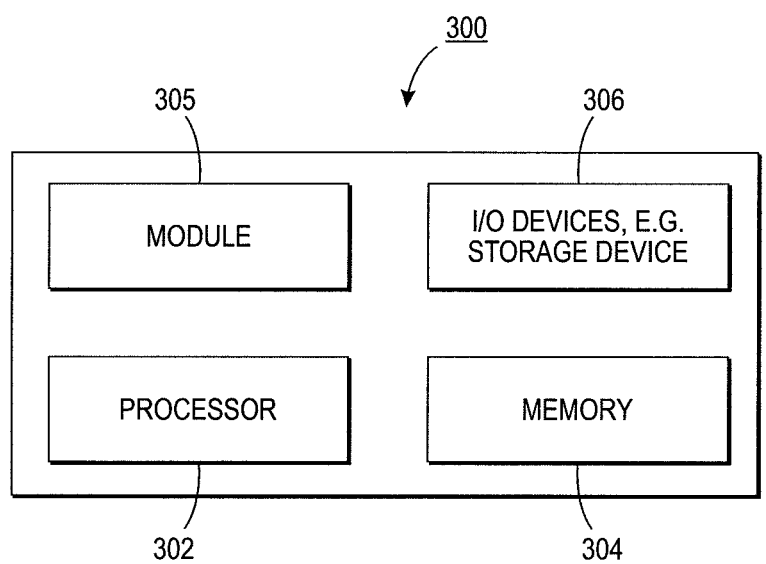
FIG. 3 illustrates a high-level block diagram of a general-purpose computer suitable for use in performing the functions described herein.

FIG. 2 illustrates a flowchart of a method 200 for communicating a command to a networked device that requires a driver via an endpoint device that does not have the driver installed. In one embodiment, one or more steps or operations of the method 200 may be performed by the endpoint 110 or a general-purpose computer as illustrated in FIG. 3 and discussed below.

At step 202 the method 200 begins. At step 204, the method 200 initiates a command for a networked device. For example, a user may want to use his or her mobile endpoint device to initiate a scan of a document on a networked scanner. The mobile endpoint device and the networked scanner may be located at an enterprise network. The mobile endpoint device may initiate a connection to the networked device by scanning an NFC tag using a "tap to scan" feature of the networked scanner. In another embodiment, the endpoint device may simply attempt to connect to the networked device scanner over an enterprise network using a wired or a wireless connection.

The mobile endpoint device may then display a universal API to the user that allows the user to initiate a command for the networked device. The mobile endpoint device may receive the command via the universal API.

At step 206, the method 200 establishes a connection to a virtual device server. Using the above example, the mobile endpoint device may communicate with the virtual device server to initiate the first connection, or the virtual scanner server if the networked device is a networked scanner, using any communication protocol that does not alter or change the translated commands that are eventually received from the virtual device server. Examples of communication protocols that may be used include an extensible messaging and presence protocol (XMPP), transported over secure hypertext transfer protocol (HTTPS), and the like.

In one embodiment, the virtual device server may be located in a remote network that is located in the "cloud" remote from the enterprise network. For example, the remote network may be accessed over the Internet.

At step 208, the method 200 instructs the virtual device server to bind to a virtual IP address. For example, the virtual device server may be capable of binding to a plurality of different virtual IP addresses reserved for the virtual device server. The endpoint device may instruct the virtual device server to bind to an available virtual IP address. The endpoint device may receive the virtual IP address and map the virtual IP address to the actual IP address of the networked device.

At step 210, the method 200 establishes a connection to a universal device driver API server. For example, the endpoint device may concurrently initiate a second connection with the universal device driver API server. In one embodiment, the universal device driver API server may also be located in the remote network similar to the virtual device server.

In one embodiment, the universal device driver API server and the endpoint device may communicate via the universal API operating on the endpoint device using a universal command language. One example of the universal command language includes the EIP protocol of Xerox® Corporation.

At step 212, the method 200 transmits the command to the universal device driver API server. Notably, the command received on the mobile endpoint device does not initially go to the networked device that the mobile endpoint device connected to in step 204. Referring back to the above example, the mobile endpoint device may send the desired command or a scan command for the networked scanner to the universal device driver API server using the universal command language. In one embodiment, the endpoint device may also send the virtual IP address bound to the virtual device server with the command.

At step 214, the method receives a translated command compatible with the driver of the networked device from the virtual device server. In one embodiment, based on the command and the operating system associated with the command, the universal device driver API server may call the corresponding driver a plurality of different drivers that are stored at the universal device driver API. The universal device driver API server may then translate the command received from the endpoint device in the universal command language into a translated command compatible with the driver.

In one embodiment, the driver may then issue the translated command to the virtual device server over the virtual IP address. The virtual device server may then forward the translated command to the endpoint device.

At step 216, the method 200 transmits the translated command to the networked device. For example, the mobile endpoint device may obtain the IP address of the networked device based upon the mapping to the virtual IP address. The mobile endpoint device may then transmit the translated scan command to the networked scanner over the IP address of the networked scanner over the enterprise network 102.

At optional step 218, the method 200 receives a response. For example, the networked scanner may send the response (e.g., scan data or data of a scanned document) back to the mobile endpoint device. However, since the mobile endpoint device does not have the vendor specific driver installed, the mobile endpoint device may not understand the response from the networked scanner.

At optional step 220, the method 200 sends the response to the virtual device server. The mobile endpoint device may send the response or the scan data from the networked scanner to the virtual device server. The virtual device server may then forward the response or the scan data to the universal device driver API server. The universal device driver API server may then translate the response or the scan data into the universal command language such that the mobile endpoint device can understand, read or display the translated response or the translated scan data. In one embodiment, the response or the scan data may be stored in a repository.

At optional step 222, the method 200 receives a translated response from the universal device driver API server. For example, the mobile endpoint device may pull the translated response from the repository via the universal device driver API server or the response may be passed to the endpoint device directly via the universal device driver API server.

At step 224, the method 200 determines if any additional commands are received. If additional commands are received, the method 200 may return to step 212 to transmit the command to the universal device driver API server. If no additional commands are received, the method 200 may proceed to step 226. At step 226, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step. In addition, it should be noted that FIG. 2 in some embodiments may be performed using any combination of the steps (e.g., using fewer than all of the steps) illustrated in FIG. 2 or in an order that varies from the order of the steps illustrated in FIG. 2.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for communicating a command to a networked device that requires a driver via an endpoint device that does not have the driver installed, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for communicating a command to a networked device that requires a driver via an endpoint device that does not have the driver installed (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for communicating a command to a networked device that requires a driver via an endpoint device that does not have the driver installed (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for communicating a command to a networked device that requires a driver via an endpoint device that does not have the driver installed, comprising:
  establishing, by a processor of the endpoint device that does not have the driver installed to directly communicate with the networked device, a first connection with a virtual device server;
  establishing, by the processor, a second connection with a universal device driver application programming interface (API) server, wherein the universal device driver API stores a plurality of drivers to translate a command generated by the endpoint device using the driver selected from the plurality of drivers;
  transmitting, by the processor, the command to the universal device driver API server;
  receiving, by the processor, a translated command compatible with the driver of the networked device from the virtual device server, wherein the translated command is received by the virtual device server from the driver that is called by the universal device driver API server;
  establishing, by the processor, a third connection with the networked device using identical connection information associated with the first connection with the virtual device server; and
  transmitting, by the processor, the translated command to the networked device over the third connection.

2. The method of claim 1, further comprising:
  receiving, by the processor, a response from the networked device that the networked device has executed the translated command;
  sending, by the processor, the response to the virtual device server; and
  receiving, by the processor, a translated response using a universal command language from the universal device driver API server.

3. The method of claim 1, further comprising:
  instructing, by the processor, the virtual device server to bind to a virtual internet protocol (IP) address.

4. The method of claim 3, further comprising:
  mapping, by the processor, the virtual IP address to an IP address of the networked device; and
  sending, by the processor, the virtual IP address to the universal device driver API server with the command.

5. The method of claim 1, wherein the command is sent to the universal device driver API server using a universal command language.

6. The method of claim 5, wherein the universal command language comprises an extensible interface platform (EIP).

7. The method of claim 1, wherein the identical connection information comprises a port that is used to connect the driver to the virtual device server.

8. The method of claim 1, wherein the universal device driver API server and the virtual device server are located in a network that is remote from an enterprise network where the endpoint device and the networked device are located.

9. The method of claim 1, wherein the universal device driver API server selects the driver from the plurality of different drivers stored at the universal device driver API server based upon the command and an operating system of the networked device.

10. A non-transitory computer-readable medium storing a plurality of instructions which, when executed by a processor of an endpoint device that does not have a driver installed to directly communicate with a networked device, cause the processor to perform operations for communicating a command to a networked device, the operations comprising:
  establishing a first connection with a virtual device server;
  establishing a second connection with a universal device driver application programming interface (API) server, wherein the universal device driver API stores a plurality of drivers to translate a command generated by the endpoint device using the driver selected from the plurality of drivers;
  transmitting the command to the universal device driver API server;
  receiving a translated command compatible with the driver of the networked device from the virtual device server, wherein the translated command is received by the virtual device server from the driver that is called by the universal device driver API server;
  establishing a third connection with the networked device using identical connection information associated with the first connection with the virtual device server; and
  transmitting the translated command to the networked device over the third connection.

11. The non-transitory computer-readable medium of claim 10, further comprising:
  receiving a response from the networked device that the networked device has executed the translated command;
  sending the response to the virtual device server; and
  receiving a translated response using a universal command language from the universal device driver API server.

12. The non-transitory computer-readable medium of claim 10, further comprising:
  instructing the virtual device server to bind to a virtual Internet protocol (IP) address.

13. The non-transitory computer-readable medium of claim 12, further comprising:
  mapping the virtual IP address to an IP address of the networked device; and
  sending the virtual IP address to the universal device driver API server with the command.

14. The non-transitory computer-readable medium of claim 10, wherein the command is sent to the universal device driver API server using a universal command language.

15. The non-transitory computer-readable medium of claim 14, wherein the universal command language comprises an extensible interface platform (EIP).

16. The non-transitory computer-readable medium of claim 10, wherein the identical connection information comprises a port that is used to connect the driver to the virtual device server.

17. The non-transitory computer-readable medium of claim 10, wherein the universal device driver API server and the virtual device server are located in a network that is remote from an enterprise network where the endpoint device and the networked device are located.

18. The non-transitory computer-readable medium of claim 10, wherein the universal device driver API server selects the driver from the plurality of different drivers stored at the universal device driver API server based upon the command and an operating system of the networked device.

19. A method for communicating a command to a networked scanner that requires a driver via a mobile endpoint device that does not have the driver installed, comprising:
    displaying, by a processor of the mobile endpoint device that does not have the driver installed to directly communicate with the networked scanner, a universal application programming interface (API) on the mobile endpoint device;
    receiving, by the processor, a scan command via the universal API;
    establishing, by the processor, a connection with a virtual device server in a network remotely located from a local enterprise network in response to a driver on the universal device driver API server connecting to the virtual device server in response to the command transmitted by the mobile endpoint device;
    instructing, by the processor, the virtual scanner to bind to a virtual internet protocol (IP) address;
    mapping, by the processor, the virtual IP address to an IP address of the networked scanner;
    establishing, by the processor, a connection to a universal device driver API server located in the network remotely located from the local enterprise network, wherein the universal device driver API stores a plurality of drivers to translate a command generated by the mobile endpoint device using the driver selected from the plurality of drivers;
    transmitting, by the processor, the scan command and the virtual IP address to the universal device driver API server using a universal command language;
    receiving, by the processor, a translated scan command compatible with the driver of the networked scanner from the virtual device server using a communication protocol that does not alter the translated scan command, wherein the virtual device server received the translated scan command from a driver stored at the universal device driver API server over the virtual IP address; and
    transmitting, by the processor, the translated scan command to the networked scanner via the IP address of the networked scanner.

20. The method of claim 19, further comprising:
    receiving, by the processor, a scan data from the networked scanner;
    sending, by the processor, the scan data to the virtual scanner server; and
    receiving, by the processor, a translated scan data using the universal command language from the universal device driver API server, wherein the universal device driver API server translates the scan data into the translated scan data.

* * * * *